Feb. 17, 1931. C. ROTH 1,793,136
ELECTROLYTIC CELL
Filed June 26, 1926
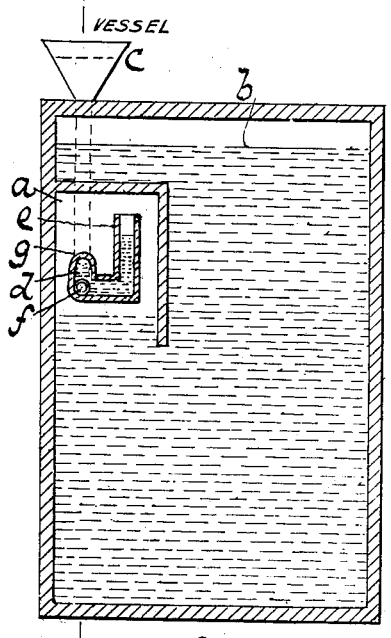
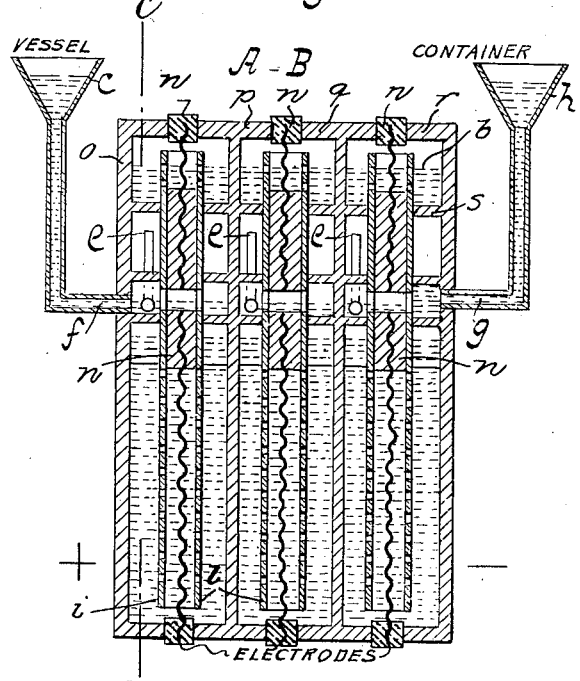
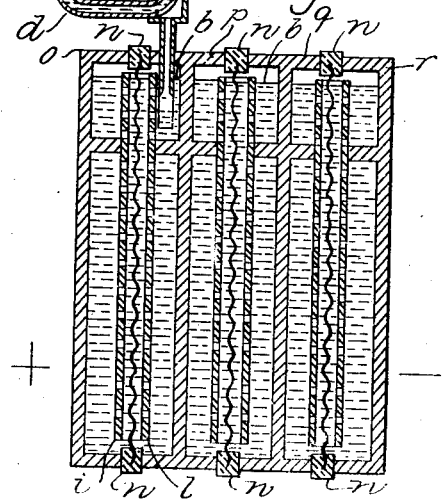
Inventor
Carl Roth
By
Attorneys Patented Feb. 17, 1931

1,793,136

UNITED STATES PATENT OFFICE

CARL ROTH, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ELECTROLYTIC CELL

Application filed June 26, 1926, Serial No. 118,811, and in Germany July 1, 1925.

The present invention relates to an arrangement for control and maintenance of the level of the electrolyte in electrolytic cells by an introduction of a quantity of electrolyte or liquid corresponding to that consumed or carried away during the electrolysis, into several cells or several elements of one cell by means of a supply pipe.

There are arrangements known for supplying electrolyte but it is a drawback that the supply pipes or channels lead directly into the electrolyte. Streaming within the cells and variations in the concentration of the electrolyte are caused thereby.

I have now found that these drawbacks can be avoided by arranging the end of the supply pipe instead of within the electrolyte as hitherto usual, within a chamber filled with a gas the pressure of which depends on the level of the electrolyte in the cell to be supplied, the outlet for the liquid from the said chamber being continuously below the level of the electrolyte within the cell. The electrolyte to be freshly added is taken from a vessel with constant level.

The accompanying drawings show diagrammatically sections of cells incorporating modes of carrying out my invention into practice to which particular examples, however, my invention is not limited.

In Figure 1 of the accompanying drawing is shown a cross section of a compartment of an electrolytic cell of the filter press type, whilst in Figure 2 such cell with three compartments is shown in cross section taken along the section line A—B of Figure 1 which latter is a cross section taken along the section line C—D of Figure 2.

The cell shown in Figure 2 consists of two end plates $o$ and $r$ and two inner plates $p$ and $q$; each plate is provided with protruding bent plates $s$ which form the gas chambers $a$. Between the plates $o$ and $p$ and $q$ and $r$ which can serve as electrodes, but may also consist of a non-conducting material, diaphragms (shown in wave lines) are inserted by means of the insulators $n$ and also the main electrodes $i$ and $l$, which latter are electrically connected with the corresponding end and middle plates $o$, $p$, $q$, and $r$ respectively, if such consist of a metal, the direction of the electric current being chosen as desired.

The supply pipe $d$ to which the supply liquid is fed through the pipe $f$ from the vessel $c$, ends at $e$ in a gas chamber $a$ arranged inside the electrolytic cell so that the pressure of the gas inside said chamber $a$ is variable according to level $b$ of the electrolyte in the cell, and the pressure of the supply liquid which is controlled by the level in the container $c$ is made equal to the pressure inside said chamber. When, with a pressure above the level $b$ of the electrolyte in the cell equal to that above $c$, the level $b$ falls by reason of the electrolyte being consumed, the pressure of the gas in chamber $a$ will become lower and as the pressure of the liquid in $c$ remains unaltered, a quantity thereof is caused to enter the gas chamber $a$ so as to restore the equilibrium mentioned above.

It is often advantageous to arrange the supply pipe $d$ in such a manner that it can be fed from two or several different points as shown at $f$ and $g$. The supply liquid may be pure water or it may contain the electrolyte in any desired concentration alone or together with other dissolved additions. If the supply liquid contains electrolytes, gases may be formed by electrolysis in the connection pipe $d$. In order to avoid trouble by this formation of gas, it may be useful to allow the gas bubbles to escape from the pipe $d$ in a suitable manner, for example by the pipe $g$ which is connected with the pipe $d$ at a higher level than the supply pipe $f$.

By taking care that the level in the container $h$ is kept constant like that in the container $c$, the cells can also be fed from the vessel $h$ when the supply from the vessel $c$ should accidentally be stopped. It may be desirable to arrange the opening of the pipe $d$ in such a manner that it does not end directly within the gas chamber $a$, but to provide small pipes which are filled with the supply liquor as shown by the upright tube ending, in the drawing and which at small variations of the pressure, prevent gas from entering at once from the gas chamber $a$ into the pipe $d$.

The gas chamber may be arranged within the cell, as shown in Figures 1 and 2, or it may be built up outside the cell or the elements of the cell and connected therewith by suitable pipes as shown for example in Figure 3, in which only one gas chamber of the aforesaid kind is shown for the sake of clearness; a plurality of arrangements of this kind can be dispensed with if the anolytic as well as the catholytic spaces of all the cells are hydrostatically connected in a usual manner.

The arrangement according to my present invention may be used for most varied kinds of electrolytic cells, for example those of the so-called trough or pot type as well as of the filter-press type whether with unipolar or bi-polar electrode connection.

I claim:

1. An apparatus for maintaining constant the level of the electrolyte in an electrolytic cell which consists of a gas chamber the pressure in which depends on the level of the electrolyte within the cell, and a supply pipe for fresh electrolyte ending within the gas space in said chamber which pipe is connected with a supply vessel containing electrolyte at a constant level, the outlet for the liquid from the said gas chamber into the cell being continuously below the level of the electrolyte within the latter.

2. An apparatus for maintaining constant the level of the electrolyte in an electrolytic cell which consists of a gas chamber the pressure in which depends on the level of the electrolyte within the cell, and a supply pipe connected with a supply vessel containing the liquid to be supplied at a constant level so as to counterbalance the pressure of the liquid in the supply pipe with the pressure in the gas chamber which pipe is provided with short pipes ending within the gas space in the gas chamber, preventing gas from entering into the supply pipe, the outlet for the liquid from the said gas chamber into the cell being continuously below the level of the electrolyte within the latter.

3. An apparatus for maintaining constant the level of the electrolyte in an electrolytic cell which consists of a gas chamber the gas pressure in which is controlled by the level of the electrolyte within the cell, and a supply pipe connected at several points with supply vessels containing the liquid to be supplied at a constant level, which pipe is provided with short pipes ending within the gas space of the gas chamber and preventing gas from entering the supply pipe, the outlet for the liquid from the said gas chamber into the cell being continuously below the level of the electrolyte within the latter.

In testimony whereof I have hereunto set my hand.

CARL ROTH.